(12) United States Patent
Aschke

(10) Patent No.: US 9,207,112 B2
(45) Date of Patent: Dec. 8, 2015

(54) SCALE WITH PIVOTING SPACER ELEMENT FOR VERTICAL ADJUSTMENT

(75) Inventor: Walter Aschke, Hamburg (DE)

(73) Assignee: SECA AG, Reinach BL (CH)

( * ) Notice: Subject to any disclaimer, the term of this patent is extended or adjusted under 35 U.S.C. 154(b) by 359 days.

(21) Appl. No.: 13/700,519

(22) PCT Filed: Mar. 15, 2011

(86) PCT No.: PCT/DE2011/000267
§ 371 (c)(1),
(2), (4) Date: Jan. 23, 2013

(87) PCT Pub. No.: WO2011/147390
PCT Pub. Date: Dec. 1, 2011

(65) Prior Publication Data
US 2013/0112489 A1    May 9, 2013

(30) Foreign Application Priority Data
May 28, 2010   (DE) .......................... 10 2010 022 440

(51) Int. Cl.
*G01G 21/23*    (2006.01)
*A47B 91/02*    (2006.01)
*G01G 19/44*    (2006.01)
*G01G 23/00*    (2006.01)

(52) U.S. Cl.
CPC ................ *G01G 21/23* (2013.01); *A47B 91/02* (2013.01); *G01G 19/44* (2013.01); *G01G 23/002* (2013.01)

(58) Field of Classification Search
CPC ..... G01G 19/44; G01G 21/23; G01G 23/002; A47B 91/02–91/04; F16M 7/00

USPC ........................................................ 177/244
See application file for complete search history.

(56) References Cited

U.S. PATENT DOCUMENTS

| 3,750,989 | A | * | 8/1973 | Bergeson ...................... 248/650 |
| 3,927,853 | A | * | 12/1975 | Guth ........................... 248/188.2 |
| 4,124,187 | A | * | 11/1978 | Webb ........................... 248/188.3 |
| 4,411,327 | A | * | 10/1983 | Lockery et al. ................ 177/211 |
| 4,518,142 | A | * | 5/1985 | Sulcek et al. ................. 248/649 |
| 4,800,973 | A | * | 1/1989 | Angel ............................ 177/211 |
| 5,332,182 | A | * | 7/1994 | Weisz et al. ................ 248/188.4 |
| 5,350,151 | A | * | 9/1994 | Aoki .............................. 248/615 |
| 5,749,550 | A | * | 5/1998 | Jackson ..................... 248/188.2 |
| 5,878,983 | A | * | 3/1999 | Olson et al. ................ 248/188.4 |

(Continued)

FOREIGN PATENT DOCUMENTS

| DE | 10006225 | 8/2001 |
| WO | 2007125550 | 11/2007 |

OTHER PUBLICATIONS

Merriam-Webster's dictionary entry for "pivot", downloaded Aug. 4, 2015.*

*Primary Examiner* — Peter Macchiarolo
*Assistant Examiner* — Natalie Huls
(74) *Attorney, Agent, or Firm* — Lucas & Mercanti, LLP; Klaus P. Stoffel

(57) ABSTRACT

The apparatus serves for weighing and has a placement surface (3) for the object to be weighed. The placement surface (3) is provided by a placement element (2) which is supportable by at least two carrying elements (6) with respect to a steepening surface. The carrying elements (6) are configured identically relative to one another. Each of the carrying elements (6) has at least one load cell (17) for weight acquisition and a levelling device for height adjustment.

9 Claims, 4 Drawing Sheets

(56) References Cited

U.S. PATENT DOCUMENTS

| | | | |
|---|---|---|---|
| 6,407,351 B1* | 6/2002 | Meyer et al. | 177/238 |
| 7,270,306 B2* | 9/2007 | Chen | 248/188.2 |
| 2002/0134593 A1* | 9/2002 | Lee | 177/245 |
| 2003/0066690 A1* | 4/2003 | Germanton | 177/256 |
| 2004/0035610 A1* | 2/2004 | Chan | 177/25.11 |
| 2006/0219445 A1* | 10/2006 | Yamashita | 177/245 |
| 2008/0302581 A1* | 12/2008 | Verhaeghe et al. | 177/145 |
| 2009/0152021 A1* | 6/2009 | Tamborini | 177/262 |
| 2010/0023293 A1* | 1/2010 | Walthert | 702/101 |
| 2012/0024329 A1* | 2/2012 | Ma | 135/16 |

* cited by examiner

SCALE WITH PIVOTING SPACER ELEMENT FOR VERTICAL ADJUSTMENT

The present application is a 371 of International application PCT/DE2011/000267, filed Mar. 15, 2011, which claims priority of DE 10 2010 022 440.5, filed May 28, 2010, the priority of these applications is hereby claimed and these applications are incorporated herein by reference.

BACKGROUND OF THE INVENTION

The invention relates to a device for weighing, which includes a placement surface for the object to be weighed, and in which the placement surface is made available by a bearing element which is supportable by at least two carrying elements relative to an installation surface.

Typically, in accordance with the state of the art, four carrying elements are arranged in the area of a massive frame and the placement element is then placed on this frame. The frame and the carrying elements are individually adapted to the respectively existing structural realization of the concrete scale. In the area of the carrying elements, weighing cells may be arranged for recording the weight, wherein the weighing cells are connected through electrical connection lines to an evaluating device.

In accordance with the state of the art, for producing differently constructed scales, a corresponding number of frames with carrying elements must be produced and made available. This results in correspondingly significant costs.

SUMMARY OF THE INVENTION

It is the object of the present invention to construct a device of the above-described type in such a way that a modular construction is reinforced.

In accordance with the invention, this object is met by identically constructing the carrying elements relative to each other and each of the carrying elements has at least one weighing cell for weight recording, and has at least one leveling device for vertical adjustment.

The identical construction of the carrying elements relative to each other facilitates a universal manufacture of the carrying elements, which leads to a simplified storage and reduces the manufacturing costs because of the greater number of units. The carrying elements can be connected to a light frame construction and may be positioned and fixed relative to the frame in dependence on the respectively present structural configuration of the scale.

For carrying out the vertical adjustment, it is proposed that the carrying element has a base element, as well as a spacer element, which is positionable relative to the base element.

A secure placement is achieved by providing the spacer element with a foot.

A secure and simultaneously accurate vertical adjustment can be effected by supporting the spacer element so as to be pivotable relative to the base element.

For making available a pivot joint, it is proposed that an elastic element is arranged in the area of a pivot joint connecting the spacer element to the base element.

A respective pivoting position can be predetermined by making the spacer element positionable by an adjusting element relative to the base element.

Low adjusting forces, when carrying out the pivoting movement, are supported by arranging the adjusting element relative to the foot opposite the pivot joint.

For fixing a positioning of a plurality of carrying elements relative to each other, it is proposed that the carrying element is provided with a frame.

A geometric adjustment to a concrete spatial dimensioning of the scale can be effected by connecting the carrying element to the frame by means of a spacer arm.

A high standing stability is achieved by connecting four carrying elements to the frame.

Adaptability to different geometries of different scales is reinforced by arranging the spacer arms so as to be positionable relative to the frame.

An introduction of forces and/or moments into the frame can be minimized by providing the foot in the area of its extension facing away from the spacer element with a contour in such a way that, in a plurality of pivoting positions of the spacer element relative to the base element, a line of action which corresponds to a force transmission direction from the bearing element to the base element, and a line of action which corresponds to a force transmission from the foot to a placement surface, are essentially directed in the same direction and so as to collapse into each other.

In the drawings, embodiments of the invention are schematically illustrated. In the drawing:

DETAILED DESCRIPTION OF THE INVENTION

Figure 1:
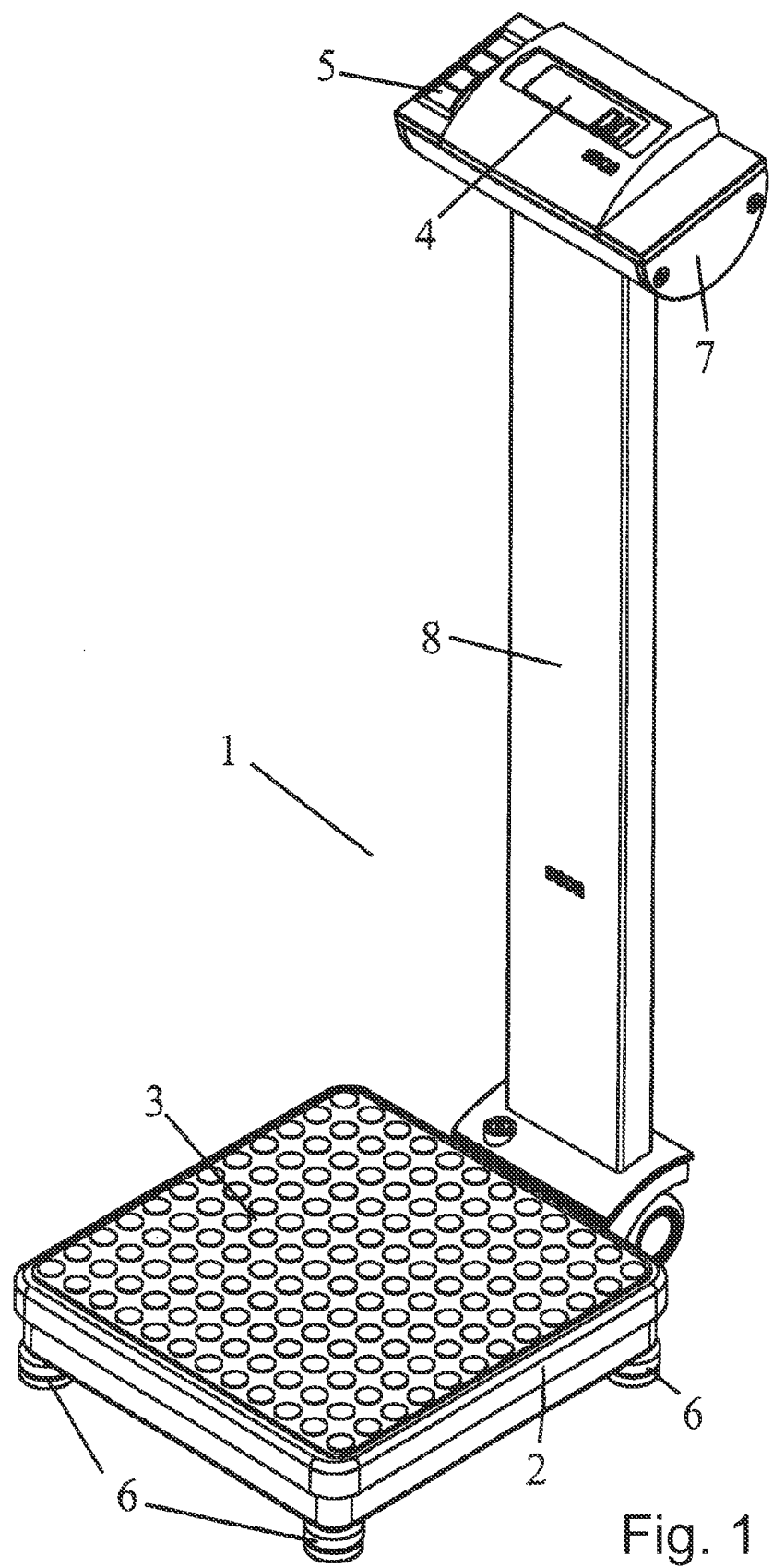
FIG. 1 shows a perspective side view of a floor scale with an indicator and operating device arranged on a column.

FIG. 1 shows a perspective illustration of a scale 1 which is constructed as a floor scale. In the area of a bearing element 2, a placement surface 3 is provided onto which the person steps to be weighed when the weighing process is carried out. An operation capability of the scale 1 is reinforced by a display 4, as well as adjusting elements 5 which are arranged in the area of a console 7. The console 7 is arranged on a level which is comfortable for the user and is supported by a column 8.

The bearing element 2 is supported by carrying elements 6 relative to an installation surface, not illustrated.

Figure 2:
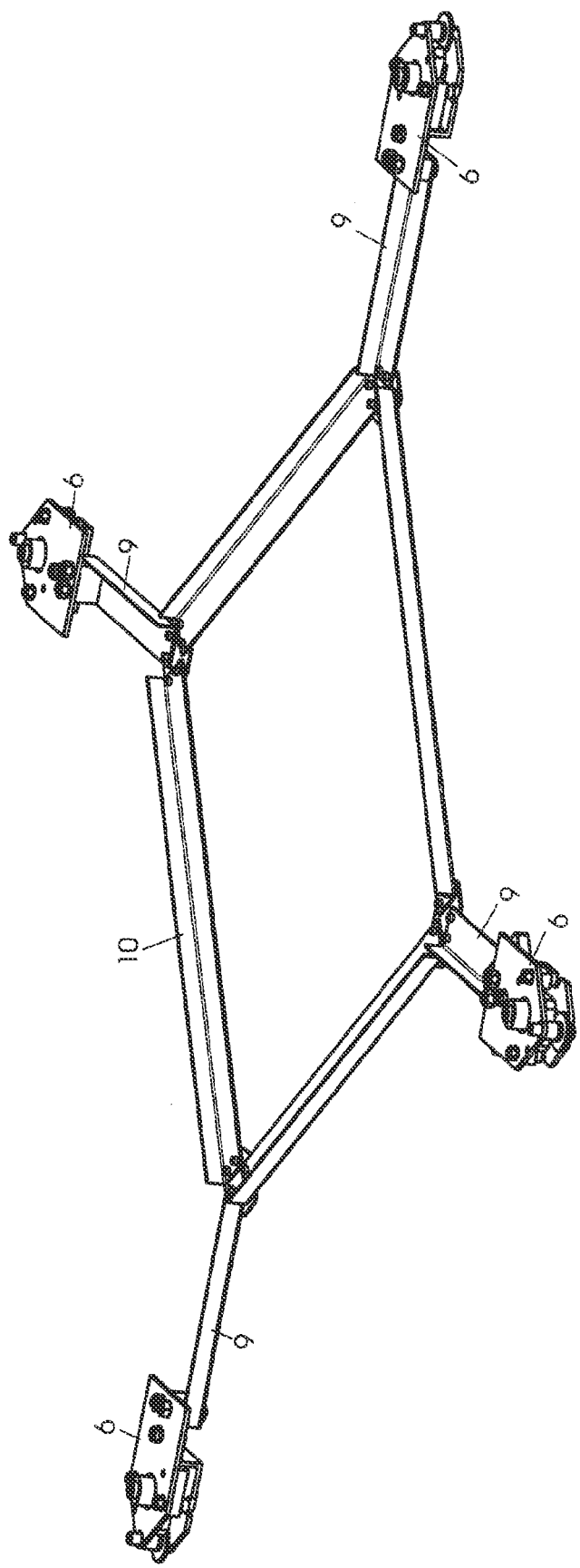
FIG. 2 shows a perspective illustration of four carrying elements which are connected to a frame through spacer arms.

FIG. 2 shows a perspective illustration of four carrying elements 6 which are each connected through a spacer arm 9 to a frame 10. Because of the construction of the carrying elements 6, which will be explained further below, the frame 10 can be constructed as a light weight construction because no great forces have to be absorbed. In the illustrated embodiment, the frame 10, as well as the spacer arms 9, consist of simple angle plates which are screwed together.

Figure 3:
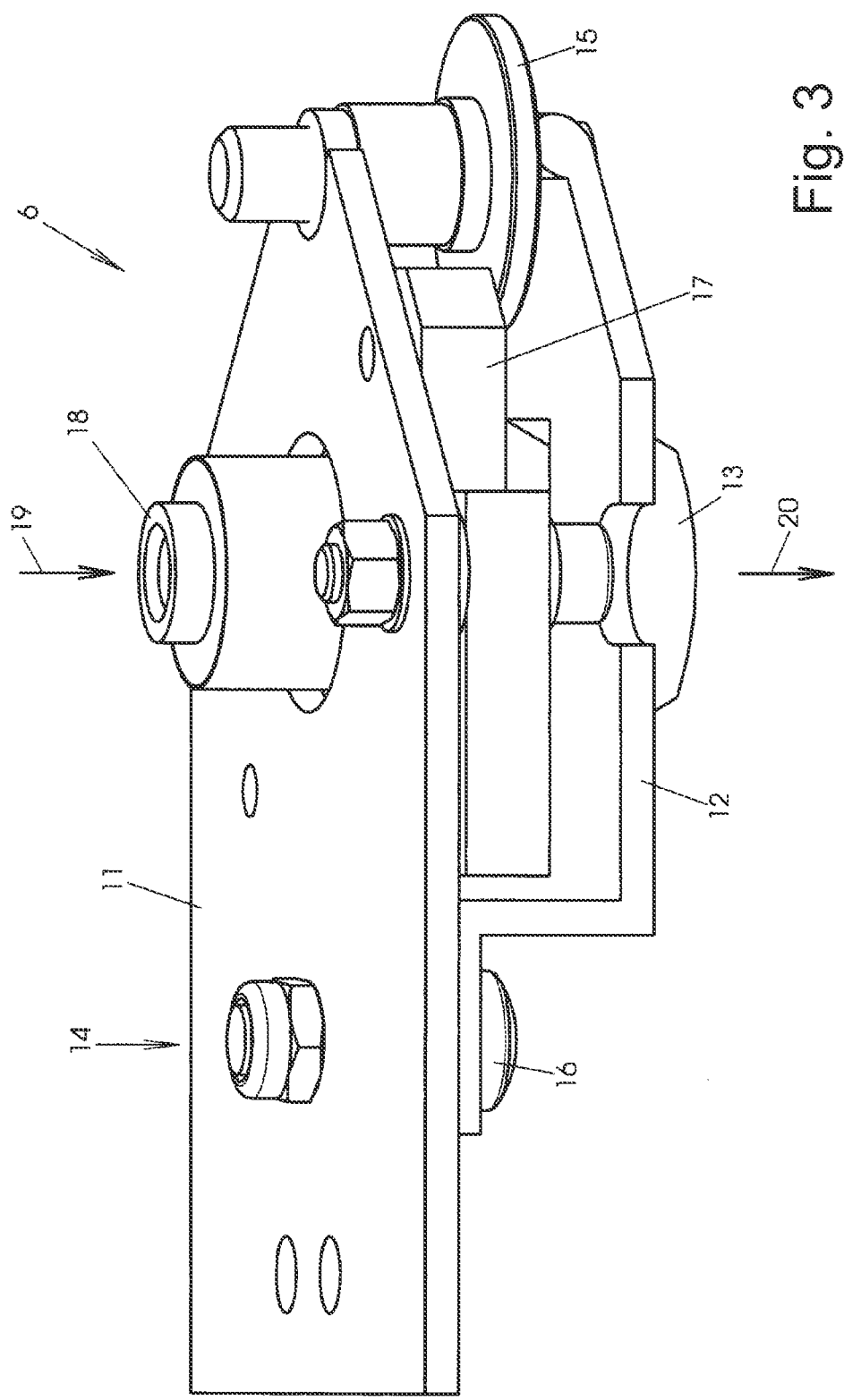
FIG. 3 is a perspective illustration of a carrying element.

The perspective side view of FIG. 3 illustrates the construction of the carrying elements 6. The carrying element 6 has a base element 11, as well as a spacer element 12, which is adjustable relative to the base element 11. A foot 13 is arranged in the area of the lower extension of the spacer element 12 in the vertical direction of the spacer element 12. The spacer element 12 is connected, on the one hand, through a pivoting joint 14 and, on the other hand, through an adjusting element 15 to the base element 11.

In the illustrated embodiment, the pivoting joint 14 consists of a bolt 16 screwed to the base element 11, on which the spacer element 12 is movably seated.

Underneath the base element 11 is arranged a weighing cell 17 which is coupled to a bearing 18 for the bearing element 2 in order to transmit the weight force to be measured. In accordance with another embodiment, the weighing cell 17 may also be arranged above the base element 11.

Shown in FIG. 3 are also a line of action 19 which indicates the direction of the weight force transmitted by the bear element 2 to the bearing 18, and a line of action 20 which illustrates the direction of the force transmitted by the foot 13 to the placement surface. It can be seen that in accordance with the embodiment in FIG. 3, the lines of action 19, 20 have essentially the same direction and are arranged along a common line of action axis. As a result of this arrangement of the lines of action 19, 20, almost no force transmission takes place from the carrying element 6 to the frame 10.

Figure 4:
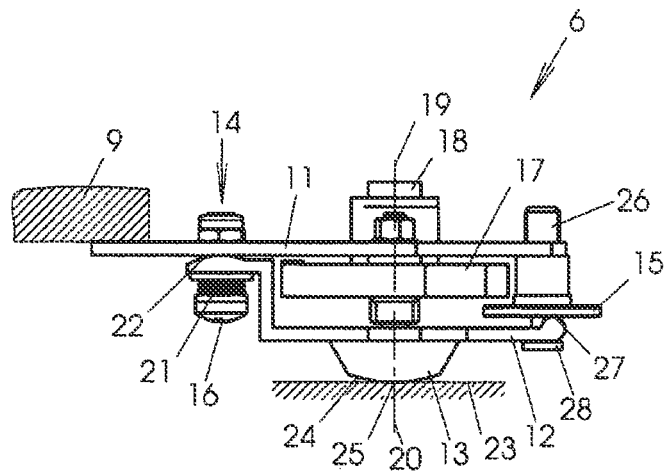
FIG. 4 is a side view of the carrying element according to FIG. 3.

FIG. 4 illustrates further details of the carrying element 6. It can be seen, for example, that in the area of the pivoting joint 14 an elastic element 21 is arranged on the bolt 16, wherein the elastic element 21 supports a pivotability of the spacer element 12 relative to the base element 1, on the one hand, and a play-free holding unit of the spacer element 12 on the other hand. The spacer element 12 has, in the area of the pivoting joint 14, in the area of its surface facing the base element 11, a curved outer contour 22 which supports rolling off of the base element 11.

It can also be seen from FIG. 4 that the foot 13 has an outwardly curved contour 24 in the area of its extension facing the placement surface 23. This contour ensures that a support point 25 identified in FIG. 4 travels, upon pivoting of the spacer element 12, along the contour 24 such that the lines of action 19, 20 always essentially coincide.

For example, the adjusting element 15 may be constructed as an adjusting wheel by means of which a bolt 26 is turned with an external thread in an internal thread of the base element 11. This causes a predeterminable turning of the bolt 26 out of the base element 11 and, as a result, pivoting of the spacer element 12. The spacer element 12 is movably guided by a bearing 27 and a counter bearing 28 relative to the bolt 26 in such a way that the intended pivoting movements can be carried out.

Figure 5:
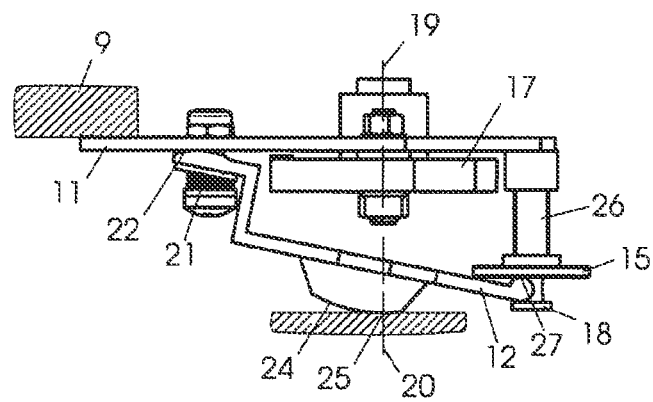
FIG. 5 shows a carrying element according to FIG. 4 with a changed vertical adjustment.

FIG. 5 shows the arrangement according to FIG. 4 after turning of the bolt 26, in such a way that the bolt 26 protrudes further downwardly out of the base element 11. This causes the spacer element 12 to be pivoted relative to the base element 11. Particularly, it can be seen that because of the contour 24 of the foot 13, the bearing point 25 is arranged also in this pivoted positioning in an extension of the lines of action 19, 20. This avoids an introduction of moments or bending forces into the spacer arm 9.

The invention claimed is:

1. A device for weighing an object, comprising: a placement surface for the object to be weighed; a bearing element that supports the placement surface; at least two carrying elements that support the bearing element relative to an installation surface, wherein the carrying elements are identical to each other and each of the carrying elements has at least one weighing cell for determining weight and a leveling device for vertical adjustment, wherein the carrying element includes a base element and a spacer element positionable relative to the base element, wherein the spacer element has a foot; and spacer arms that connect the carrying elements to the frame, a respective one of the spacer arms being assigned to a respective one of the carrying elements, wherein the foot has, in an area of extension facing away from the spacer element, a contour so that in a plurality of pivoting positions of the spacer element relative to the base element, a line of action that corresponds to a force transmission direction from the bearing element to the weighing element, and a line of action which corresponds to a force transmission from the foot to the installation surface remain the same and the foot pivots about an axis that is different from the line of action of the bearing element, the foot being pivotably attached to the base element so as to be physically decoupled from the force transmission of the bearing element.

2. The device according to claim 1, wherein the spacer element is mounted so as to be pivotable relative to the base element.

3. The device according to claim 2, wherein an elastic element is arranged in an area of a pivoting joint that connects the spacer element to the base element.

4. The device according to claim 3, further comprising an adjusting element for positioning the spacer element relative to the base element.

5. The device according to claim 4, wherein the adjusting element is arranged relative to the foot opposite the pivoting joint.

6. The device according to claim 1, and further comprising a frame, the carrying elements being connected to the frame.

7. The device according to claim 1, wherein four carrying elements are connected to the frame.

8. The device according to claim 1, wherein the spacer arms are mounted so as to be positionable relative to the frame.

9. The device according to claim 1, wherein the spacer element pivots vertically relative to the base element.

\* \* \* \* \*